United States Patent Office 3,476,534
Patented Nov. 4, 1969

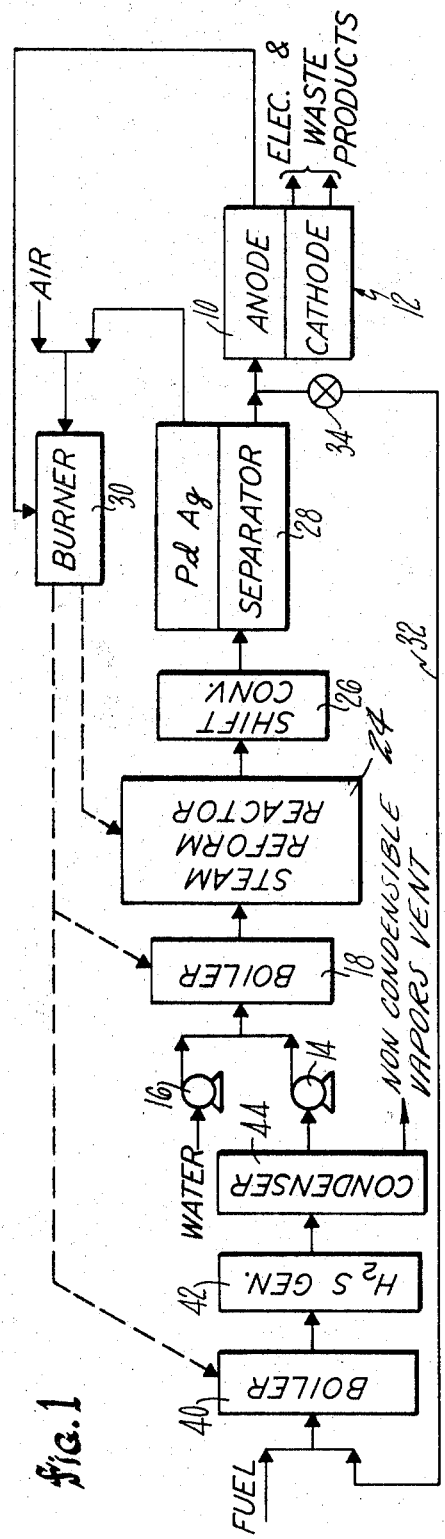
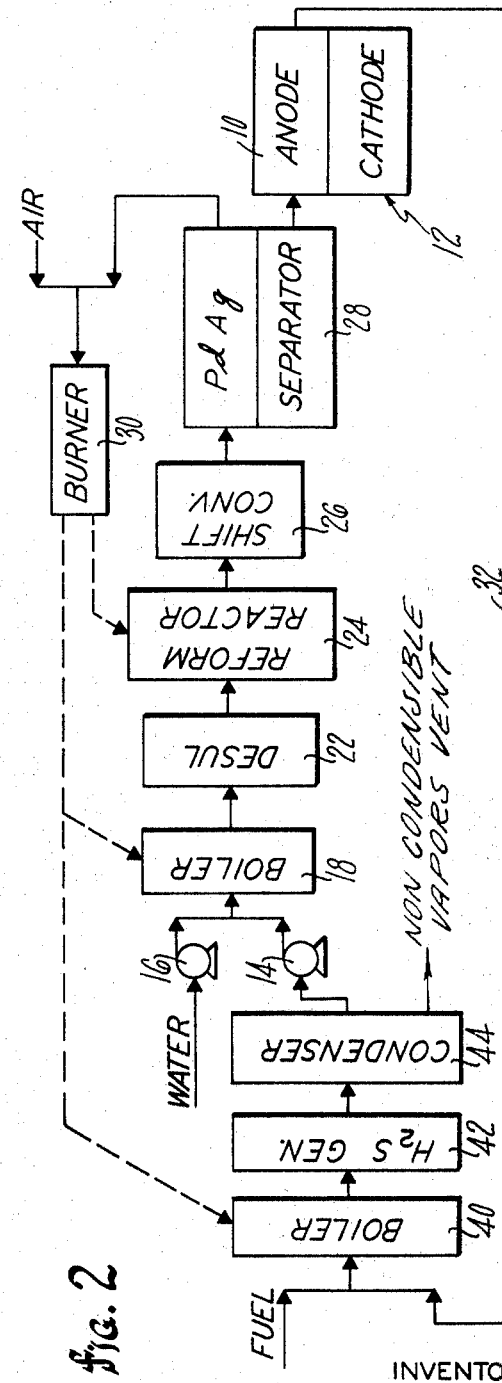

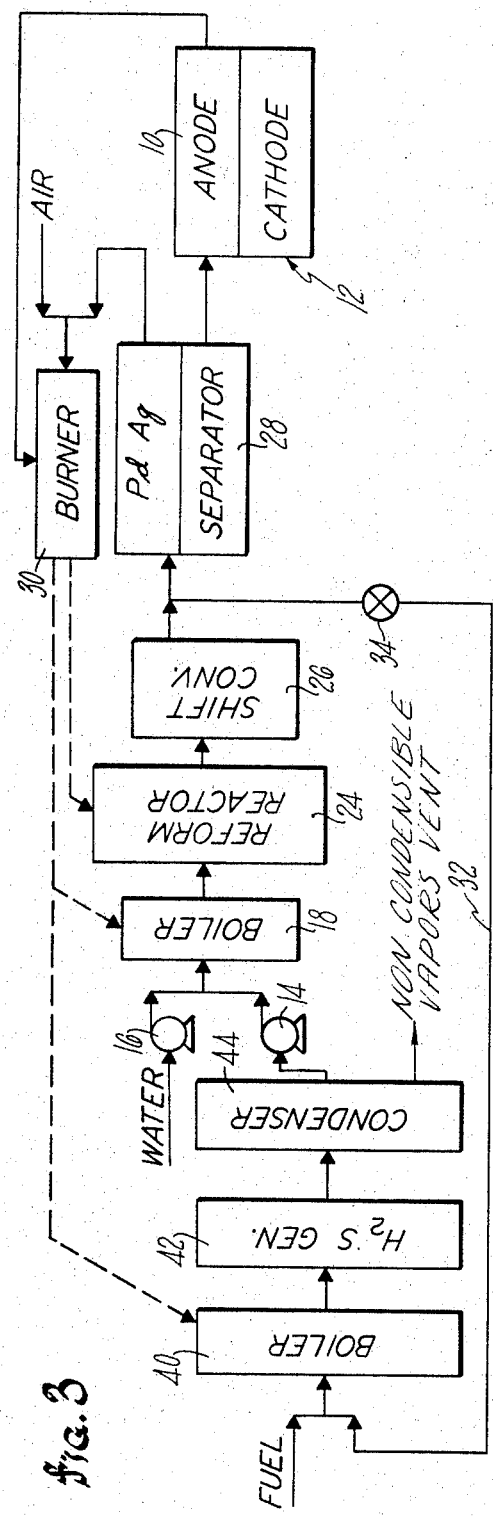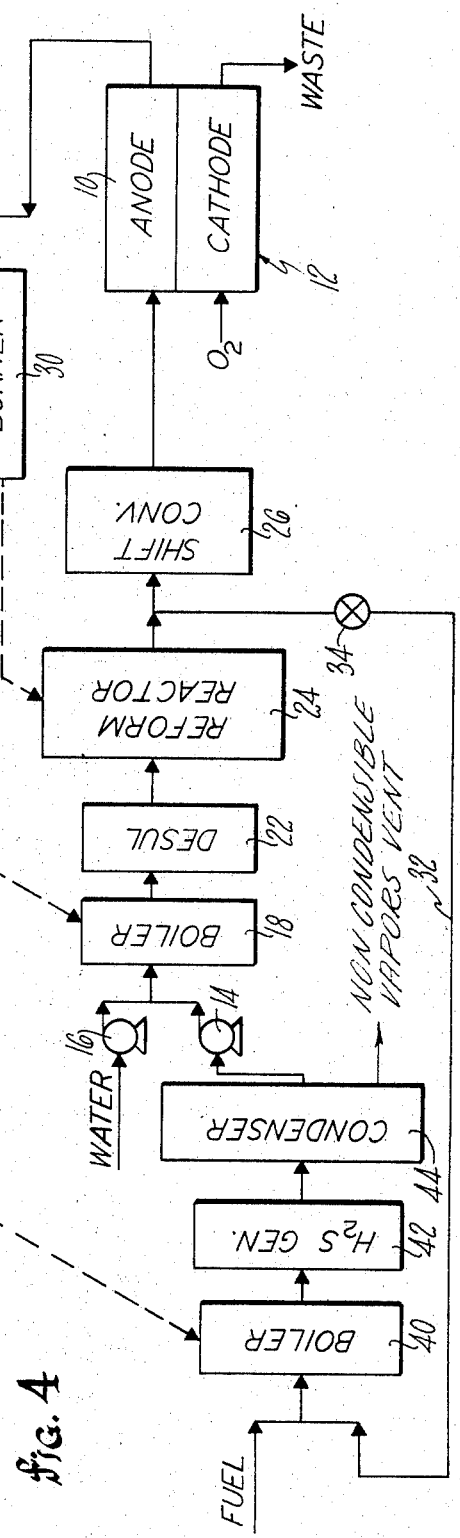

3,476,534
HYDROGEN GENERATOR INCLUDING DESULFURIZATION WITH LOW PRESSURE HYDROGEN FEEDBACK
Richard F. Buswell, Glastonbury, Herbert J. Setzer, Ellington, and Richard A. Sederquist, Newington, Conn., assignors to United Aircraft Corporation, East Hartford, Conn., a corporation of Delaware
Filed Sept. 26, 1967, Ser. No. 670,641
Int. Cl. C10g 23/00
U.S. Cl. 48—94    6 Claims

ABSTRACT OF THE DISCLOSURE

A hydrogen generator wherein hydrocarbon fuel fed to said generator is mixed with feedback hydrogen at low pressure; the mix is vaporized in a boiler, passed through an organic-sulfur converter (a hydrogen-sulfide generator) and is then condensed. The output of the condenser is then pumped to high pressure and mixed with high pressure water to form feedstock for the steam-reforming reactor. The feedback hydrogen may be taken from the output of a palladium-silver separator, from the effluent of a hydrogen utilization device, from a shift converter, or from the steam-reforming reactor.

CROSS-REFERENCE TO RELATED APPLICATIONS

Details of a hydrocarbon generator of which the present invention may be comprised are disclosed in an application of the same assignee, entitled Method and Apparatus for Generating Hydrogen From Liquid Hydrogen Containing Feedstock, filed Aug. 3, 1965, by R. F. Buswell et al., Ser. No. 476,906.

BACKGROUND OF THE INVENTION

Field of invention

This invention relates to desulfurization of hydrocarbon fuels for a hydrogen generator, and more particularly to a feedback system capable of utilizing hydrogen at low pressure for the enrichment of hydrocarbon fuel as an assist in the desulfurization process.

Description of the prior art

Fuel cell powerplants are known to include two separate main sections. One is the fuel cell proper, which reacts oxygen (or air) with hydrogen so as to form electricity together with waste hydrogen and air byproducts as well as heat and water. The other portion of the fuel cell powerplant system is the hydrogen generator, which is sometimes referred to as a reformer. The hydrogen generator portion of a fuel cell powerplant reacts a combination of hydrocarbon fuel and water to generate hydrogen gas for use in a fuel cell reactor. In the prior art, such systems utilize sulfur-free hydrocarbon fuels. However, the usefulness of fuel cells is mitigated due to the need for special refining of the hydrocarbon fuel so as to achieve a low sulfur content prior to use in a fuel cell powerplant system. In order for the efficiencies of a fuel cell to reach maximum value, many applications of fuel cells would be enhanced by the ability of the fuel cell to use commercially available hydrocarbon fuels such as jet engine fuel, unleaded gasolines, natural gas, etc., as a source of hydrocarbons for the hydrogen generation. This would require desulfurization within the hydrogen generator.

SUMMARY OF INVENTION

The primary object of the present invention to provide a low pressure hydrogen feedback system for the hydrodesulfurization of hydrocarbon fuels in a hydrogen generator.

According to the present invention, hydrogen generated or effluent hydrogen from a hydrogen utiliziation device, is mixed with hydrocarbon fuel at low pressure, vaporized and desulfurized, and is then combined with water to form the feedstock for a hydrogen generator.

The foregoing and other objects, features and advantages of the present invention will became more apparent in the light of the following detailed description of preferred embodiments thereof as illustrated in the accompanying drawing.

BRIEF DESCRIPTION OF THE DRAWING

FIG. 1 is a schematic block diagram of one embodiment of the invention in which hydrogen is fed back from a palladium-silver separator;

FIG. 2 is a schematic block diagram of another embodiment of the present invention in which hydrogen is fed back from the effluent of a hydrogen utilization device, such as a fuel cell;

FIG. 3 is a schematic block diagram of a further emboodiment of the present invention in which hydrogen is fed back from a shift converter; and FIG. 4 is a schematic block diagram of still another embodiment of the present invention in which hydrogen is fed back from a steam-reforming reactor.

DESCRIPTION OF THE PREFERRED EMBODIMENT

The present invention is particularly concerned with the ability to utilize low pressure hydrogen to enrich hydrocarbon fuels for hydrodesulfurization, without the need to supply pumps for increasing the pressure of gaseous hydrogen.

In the embodiment of FIG. 1 fuel and water which is pumped to a high pressure by corresponding pumps 14, 16 are mixed at the input to a boiler 18 to provide a superheated vapor including steam reforming reactor 24 and then through a shift converter 26. The steam reforming reactor 24 converts the superheated steam and hydrocarbon vapors into molecular hydrogen, methane, carbon monoxide, and carbon dioxide. Some traces of hydrocarbons may pass through the reactor without being reformed, and some amount of steam will also pass therethrough without reacting. In the shift converter 26, carbon monoxide is combined with some of the unreacted steam so as to form more molecular hydrogen and carbon dioxide. Details of the pumps 14, 16, the boiler 18, the steam-reforming reactor 24 (which is sometimes referred to as a dehydrogenation reactor) and the shift converter 26 are illustrated in a copending application of the same assignee entitled Method and Apparatus for Generating Hydrogen From Liquid Hydrogen Containing Feedstocks, filed on Aug. 3, 1965, by Richard F. Buswell et al., Ser. No. 476,906. In the embodiment of FIG. 1, relatively pure hydrogen is separated from the other constituents of the shift converter product in a palladium-silver separator 28. The palladium-silver separator 28 includes two chambers separated by a palladium-silver membrane. Hydrogen pressure on one side of the membrane will diffuse to the other side of the membrane. It is through this medium that hydrogen is separated from the product of the steam reforming reactor and shift converter. Of course, other suitable hydrogen separation may be used, in accordance with the skill of the art. The hydrogen may be fed to the anode 10 of a fuel cell 12 (or to some other hydrogen utilization device), and the bleed gas from the separator 28 is mixed with air and combusted in a burner 30 which supplies heat for the steam reforming reactor 24 as well as for the boilers. Effluent from the anode 10 of the fuel cell 12 may also be fed to the burner 30 so as to efficiently use the byproducts of the fuel cell reaction.

The present invention is concerned with desulfurization of the hydrocarbon fuel before utilization in the hydrogen generator. In order to achieve this, in the embodiment of FIG. 1, some portion of the hydrogen generated at the output of the palladium-silver separator 28 is fed through a valve 34 and a feedback line 32 to be mixed with hydrocarbon fuel at the inlet to a boiler 40. The boiler provides a superheated vapor of hydrocarbons and molecular hydrogen which is then passed into an organic sulfur converter 42 which generates hydrogen sulfide. Most of the sulfur in the hydrocarbon fuel will combine to form hydrogen sulfide; the hydrogen sulfide is removed from the feedstock in a condenser 44. The condenser 44 also serves to reliquify the desulfurized fuel so that it may be pressurized in a liquid pump 14 rather than requiring a pump capable of operating in the gas phase.

The condenser may be combined with either of the boilers 18, 40, or the steam-reforming reactor 24 so as to preheat the input thereto. However, this is a well-known expedient within the skill of the art, and is not germane to the present invention; therefore details of such utilization of the heat generated in the condenser is left to the design of any particular system in accordance with the skill of the art.

Thus, the apparatus 40-44 represents a low pressure desulfurizor capable of utilizing low pressure hydrogen feedback. This, therefore, eliminates the need for the pressurizing of gaseous hydrogen, which in many systems gives rise to weight or operating restrictions which are not tolerable. The details of the hydrogen sulfide generator 42 may be selected from among many variations or organic sulfur converters which are known in the art, the particular nature of which is not germane to the present invention, but relates more to the parameters of a system being designed.

The embodiment illustrated in FIG. 2 is identical with the embodiment of FIG. 1 with the exception of the fact that, instead of feeding a portion of the hydrogen output of the palladium-silver separator 28 to the input of the boiler 40, the effluent from the anode 10 of the fuel cell 12 is fed back over a feedback line 32 to the input of the boiler 40. This has the advantage of efficient usage of the hydrogen generated for the production of electricity in the fuel cell (or in some other apparatus utilizing hydrogen). When anode effluent is used as the source of hydrogen feedback, it is desirable to utilize the separator 28 to avoid passing inert or other waste products back into the anode. Anode effluent return will also supply some amount of fuel cell byproduct water to the hydrogen-generating reaction, and is therefore quite efficient. Also FIG. 2 illustrates that a final desulfurizing filter 22 of the type described in either of the aforementioned applications filed on even date herewith may be used if desired.

The embodiment illustrated in FIG. 3 is similar to the embodiments of FIGS. 1 and 2 except that hydrogen for the boiler 40 is obtained by diverting a portion of the output of the shift converter 26 through a feedback line 32, the portion diverted being controllable by a valve 34 or by choice of suitable sizing of the lines. Because the effluent of the anode 10 of the fuel cell 12 is not being utilized for hydrogen feedback, the effluent from the anode may be fed to the burner as in the embodiment of FIG. 1.

The embodiment of FIG. 4 illustrates the fact that the present invention will work equally well in a system not using a palladium-silver separator. As shown in FIG. 4 impure hydrogen is fed to the boiler 40 through the valve 34 and feedback line 32 from the steam-reforming reactor 24. It is to be understood that the invention may be utilized in systems having various configurations, and it is not limited by the choice of source of hydrogen, nor by the pressure at which the hydrogen is obtained. In the embodiments of FIGS. 1 and 2, the hydrogen is at very low pressure in contrast with the pressure of water and fuel as they leave respective pumps 14, 16. The pressure from hydrogen obtained in either of the embodiments of FIGS. 3 and 4 is at a much higher pressure since the pressure loss takes place in a palladium-silver separator, if used. However, this pressure is easily reduced by proper choice and adjustment of the valve 34. Thus, though the present invention finds its greatest utility and advantage in systems in which there is a high pressure drop in the hydrogen at the output of the hydrogen generator (as in FIGS. 1 and 2) it is equally useful for hydrogen fed back at higher pressures (as in FIGS. 3 and 4). However, the embodiment of FIG. 4 can be operated at nearly atmospheric pressure if desired, since there is no separator 28, and therefore no great pressure drop before the entrance of hydrogen into the fuel cell. All that is required is a sufficient pressure differential to maintain the flow of feedback hydrogen. High pressures are desirable, on the other hand, to enhance the desulfurization process. Although the embodiments herein illustrate the use of hydrogen in the anode of a fuel cell, it should be understood by those skilled in the art that the principle of the present invention, which relates to diffusion of feedback hydrogen for desulfurization of hydrocarbon feedstock is equally valuable without regard to the use of which the generated hydrogen is to be put.

Although the combination of an organic-sulfur converter 42 with a condenser 44 is preferable to the use of a combined catalyst-adsorber type of desulfurizing means since the catalyst-adsorber type becomes depleted and must be replaced periodically, it should be understood that in certain utilizations of the present invention, a catalyst-adsorbent type of desulfurizer may be used in place of the organic-sulfur converter 42. Such usage is within the scope of the present invention.

Although the invention has been shown and described with respect to preferred embodiments thereof, it should be understood by those skilled in the art that the foregoing and other changes and omissions in the form and detail thereof may be made therein without departing from the spirit and scope of the invention, which is to be limited and defined only as set forth in the following claims.

Having thus described typical embodiments of the invention, that which we claim as new and desire to secure by Letters Patent of the United States is:

1. A hydrogen generator, comprising:
   a source of hydrocarbon fuel;
   a first boiler connected to said source of hydrocarbon fuel for vaporizing said fuel;
   dual means for removing sulfur from the fuel and for condensing vaporized fuel, said means being connected to said first boiler to receive vaporized fuel therefrom;
   a pump connected to the output of said last named means for pumping the condensed desulfurized fuel to a given pressure;
   a source of water at a pressure on the same order of magnitude as said given pressure;
   a second boiler connected to said pump and to said source of pressurized water, said second boiler vaporizing the water and fuel components fed thereto;
   a steam reforming reactor connected to the output of said second boiler, said steam reforming reactor providing a product including at least some molecular hydrogen;
   and feedback means connected downstream of the output of said steam reforming reactor for feeding at least a portion of the molecular hydrogen produced in said steam reforming reactor to the input of said first boiler for mixing with the hydrocarbon fuel from said source.

2. A hydrogen generator according to claim 1 wherein said feedback means connects the output of said steam reforming reactor with the input of said first boiler.

3. The hydrogen generator according to claim 1 additionally comprising:

a shift converter, the input of which is connected to the output of said steam reforming reactor, and wherein said feedback means connects the output of said shift converter to the input of said first boiler.

4. A hydrogen generator according to claim 1 including:

separation means having a pair of chambers separated by a hydrogen diffusion membrane, a first of said chambers being connected downstream of said steam reforming reactor so as to receive product therefrom, said feedback means being connected to the output of the second one of said chambers, whereby at least a portion of the molecular hydrogen diffused through said membrane is fed back to the input of said first boiler.

5. A hydrogen generator according to claim 1 including:

a hydrogen utilization device having an effluent including at least some molecular hydrogen, the input to said hydrogen utilization device being connected downstream of said steam reforming reactor to receive at least a portion of the product therefrom, said feedback means being connected to the effluent of said hydrogen utilization apparatus whereby effluent hydrogen is fed back to the input of said first boiler.

6. The hydrogen generator according to claim 1 wherein said desulfurization and condensing means comprises an organic sulfur converter having its input connected to said first boiler, the output of said organic sulfur converter being fed to a condenser, with the output of said condenser being fed to said pump.

References Cited

UNITED STATES PATENTS

| | | | |
|---|---|---|---|
| 2,773,561 | 12/1956 | Hunter | 23—210 XR |
| 2,902,440 | 9/1959 | Beuther et al. | 48—224 XR |
| 2,976,134 | 3/1961 | Paull | 48—213 XR |
| 3,019,096 | 1/1962 | Milbourne | 48—213 |
| 3,148,031 | 9/1964 | Vahldieck et al. | 23—210 |
| 3,178,272 | 4/1965 | Dent et al. | 48—213 |
| 3,278,268 | 10/1966 | Pfefferle | 23—212 |
| 3,350,176 | 10/1967 | Green et al. | 48—214 XR |

FOREIGN PATENTS 992,161   5/1965   Great Britain.

MORRIS O. WOLK, Primary Examiner

BARRY S. RICHMAN, Assistant Examiner

U.S. Cl. X.R.

23—210, 212; 48—214; 208—209